United States Patent
Maher et al.

(10) Patent No.: US 6,768,352 B1
(45) Date of Patent: Jul. 27, 2004

(54) LOW VOLTAGE RECEIVER CIRCUIT AND METHOD FOR SHIFTING THE DIFFERENTIAL INPUT SIGNALS OF THE RECEIVER DEPENDING ON A COMMON MODE VOLTAGE OF THE INPUT SIGNALS

(75) Inventors: Kenneth A. Maher, Cork (IE); Anthony Blake, Co. Cork (IE)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 10/293,392

(22) Filed: Nov. 13, 2002

(51) Int. Cl.[7] .............................. H03K 3/00; H03B 1/00
(52) U.S. Cl. ............................ 327/112; 326/83; 326/86
(58) Field of Search ................................. 327/108, 112, 327/333; 326/30, 82, 83, 86; 330/258, 260

(56) References Cited

U.S. PATENT DOCUMENTS

| | | | |
|---|---|---|---|
| 4,907,121 A | 3/1990 | Hrassky | 361/154 |
| 5,043,674 A | 8/1991 | Bonaccio et al. | 330/257 |
| 5,280,199 A | 1/1994 | Itakura | 327/63 |
| 5,939,904 A | * 8/1999 | Fetterman et al. | 327/67 |
| 6,107,882 A | * 8/2000 | Gabara et al. | 330/253 |
| 6,130,548 A | 10/2000 | Koifman | 326/21 |
| 6,236,242 B1 | 5/2001 | Hedberg | 327/65 |
| 6,281,753 B1 | 8/2001 | Corsi et al. | 330/261 |
| 6,294,932 B1 | * 9/2001 | Watarai | 326/83 |

OTHER PUBLICATIONS

US2003/0122593, "low supply voltage differential signal driver" by Volk, Jul. 3, 2003.*

* cited by examiner

Primary Examiner—Tuan T. Lam
(74) Attorney, Agent, or Firm—Kevin L. Daffer; Conley Rose P.C.

(57) ABSTRACT

An improved communication system, receiver, and method are provided that can reduce input voltages received by the receiver whenever those voltages extend upward to the maximum common-mode voltage range. A detect circuit determines whether the input voltages are at or near the maximum range. If so, the detect circuit sends a control signal to a level shift circuit which will reduce the input voltages by a predefined amount. The reduced voltages can then be forwarded to a sense circuit which preferably operates at a power supply voltage that is less than the maximum differential input voltage (i.e., the maximum voltage on the differential pair of signals), or less than the maximum common-mode voltage of the differential input signals. The sense circuit can thereby operate at a relatively wide common-mode voltage range, and utilizes a lower power supply voltage. The sense circuit can also be made up of a relatively simple differential pair of transistors with corresponding resistor loads in order to sense a differential input voltage range of, for example, 800 millivolts to 2.4 volts prior to voltage reduction, and 800 millivolts to 2.0 volts after voltage reduction.

21 Claims, 3 Drawing Sheets

LOW VOLTAGE RECEIVER CIRCUIT AND METHOD FOR SHIFTING THE DIFFERENTIAL INPUT SIGNALS OF THE RECEIVER DEPENDING ON A COMMON MODE VOLTAGE OF THE INPUT SIGNALS

BACKGROUND OF THE INVENTION

1. Field of the Invention

This invention relates to the transmission of data and, more particularly, to receivers that receive transmitted differential pairs of signals that selectively shift downward in voltage depending on the common mode voltage of those differential signals.

2. Description of the Related Art

The following descriptions and examples are not admitted to be prior art by virtue of their inclusion within this section.

The transmission of data involves sending and receiving data over a transmission path. The transmission path is connected between a pair of transceivers and each transceiver can have a receiver and a transmitter. The receiver receives data from the transmission path and the transmitter drives data onto the transmission path.

Numerous transmission protocols have been established for sending and receiving data across a transmission path. For example, IEEE Std. 1596 specifies a protocol for sending differential signals across a transmission path in order to achieve a relatively high transfer rate (e.g., 16 bits can be transferred every 2 ns). IEEE Std. 1596 utilizes low voltage differential signals (LVDS) which are, in some instances, as low as 250 mV swing compatible with low voltage MOS, BiCMOS, Bipolar, and GaAs transceiver circuitry. Ideally, the power dissipation of LVDS transceivers or the LVDS input/output (I/O) interface devices is low since only approximately 2.5 mA is needed to generate the differential voltage across a nominal 100 ohm termination resistor.

The receiver or buffer of a LVDS I/O interface device essentially operates as a differential sense amplifier that can ideally accept a relatively wide common-mode input voltage range with a high common-mode rejection ratio. However, as with most circuits, a practical sense amplifier has a limit as to the common-mode voltage that it can accept. Most conventional sense amplifiers are rated based on the common-mode voltage range that they can accept and still remain operational. Thus, many sense amplifiers are rated as either accepting of a relatively high common-mode voltage range or a relatively low common-mode voltage range.

The maximum voltage of the differential inputs acceptable to a LVDS receiver can be approximately 2.4 volts, with a minimum voltage of approximately 0 volts. At somewhat low differential swings, a LVDS receiver might then be rated as one that receives both a high and a low common-mode voltage. In order to achieve this relatively wide common-mode range, many conventional receivers employ a multiple stage architecture. A first stage might be a pair of differential transistors connected to load resistors tuned to a high common-mode range, and the second stage might be another pair of differential transistors and load resistors tuned to a relatively low common mode range. The multiple stages must be connected to each differential input terminal, with the parallel pair of stages then merged to achieve a single ended signal that will conform to the minimal accepted levels of the circuit fed by the receiver. Various examples of multi-stage, parallel sense architecture, and the complex nature of such circuitry is set out in U.S. Pat. Nos. 4,907,121 and 6,236,242 (herein incorporated by reference).

Instead of using multiple stage sense circuits, it would be desirable to implement only a single stage to achieve sensing across the entire common-mode range. Use of a single sense circuit can be achieved if, for example, the common-mode range is slightly reduced or narrowed. In many differential signal protocols, a common mode range need not extend from approximately 0 volts to 2.4 volts. Instead, the common-mode range might simply be, for example, from 0.8 volts to 2.4 volts, thereby desirably allowing a single sense circuit. Unfortunately, differential signals at the upper end of the common mode specification require a power supply that exceeds those signals.

In addition to employing a single sense circuit, it would be of further benefit to reduce the power consumption within the overall receiver by introducing a power supply voltage that is less than the maximum single-ended voltage of a differential pair of voltages (hereinafter "maximum voltage on a differential pair"), and less than the maximum common-mode input voltage. The improved receiver can, therefore, detect the differential voltage change using a rather simple, low voltage sense circuit, even though the common-mode input voltage might exceed the power supply of the sense circuit or receiver.

SUMMARY OF THE INVENTION

The problems outlined above are in large part solved by an improved transmission system. The transmission system includes a receiver that provides many advantages over conventional receivers. For example, the receiver uses a simple sense circuit made up of only one stage and avoids the complexities of the multi-stage, parallel-fed sense architecture. The sense circuit can simply have a pair of differential transistors connected to respective resistor loads. Multiple pairs of differential transistors and load resistors can, therefore, be avoided and the costs associated therewith. Second, the sense circuit can sense the full extent of a somewhat reduced (yet still relatively wide) common-mode input voltage range.

According to one example, the minimum and maximum voltages on a differential pair can range from 800 millivolts to 2.4 volts. If the differential swing is only 100 millivolts, then the sense circuit can sense across a common mode range of approximately 850 millivolts to 2.35 volts. Like other circuitry within the buffer (or receiver), the sense circuitry operates at a reduced power supply voltage that need not be equal to or greater than the maximum voltage being received by the receiver or sensed by the sense circuitry. Instead, the receiver employs a level shift circuit that selectively reduces each voltage of the differential input signal (i.e., the common-mode input voltage) so that the maximum voltage of the differential pair of signals can exceed the power supply voltage. The amount by which the maximum differential input voltage (alternatively known as the maximum voltage on the differential pair) can exceed the supply voltage is predetermined and, preferably, can be in the range of 150 millivolts to 250 millivolts and, more preferably, between 175 millivolts to 225 millivolts.

The level shift circuit reduces each voltage of the differential input voltages only if the common-mode voltage of the differential input voltages exceeds a certain threshold. According to one example, the amount by which the level shift circuit reduces each voltage can be somewhere in the range of 350 millivolts to 450 millivolts and, more preferably, between 375 millivolts to 425 millivolts. If the maximum voltage of the differential input signals is 2.4 volts as received upon the termination resistor, the level shift circuit employs a transistor that selectively forwards current through a reducing resistor so that the common mode voltage of differential signals having a high common mode voltages is reduced. For example, the amount of reduction can be approximately 400 millivolts to level shift the 2.4 volt input to approximately 2.0 volts as received upon the sense circuit. If the sense circuit is powered by a 1.8 volt power supply, for example, then the 2.0 volt input will provide enough margin so that a differential of, for example, 100 millivolts can be registered on the output of the sense circuit with minimal attenuation.

The level shift circuit is designed to only level shift differential input signals that have a relatively high common-mode voltage. If the differential signals have a relatively low common-mode voltage (e.g., lower than 800 millivolts, or between 800 millivolts to 1.0 volts), then the level shift circuit does not downward shift the common mode voltage. This proves beneficial since any downward shifting of the lower end of the common mode range would force a more complex sense circuit, possibly necessitating dual-stage parallel-fed sense circuits where multiple pairs of differential transistors and load resistors would be needed. Instead, the level shift circuit adapts and is controlled by the common-mode voltage to only level shift the high common-mode voltages that exceed 1.0 volts or, possibly, 1.5 volts.

A common mode range between 800 millivolts and 2.4 volts is utilized and can be specified within, for example, the transceiver or I/O interface circuits of communication modules described by the Optical Internetworking Forum ("OIF"), as set out in the System Packet/Fiber Interface ("SFI") protocol. Differential signals sent across an SFI-4 transmission path between, for example, a framer/mapper and a serializer/deserializer (SERDES) can, therefore, have a specified minimum and maximum differential signal range of 800 millivolts to 2.4 millivolts (with a common mode range somewhere therebetween depending on the swing of the differential signals). Utilizing this range in a simple sense circuit that is a low power sense circuit within a low power receiver proves advantageous over conventional transceivers that operate according to the SFI-4 protocol of an OC-192 SERDES framer interface, for example.

According to one embodiment, a transmission system is provided. The transmission system includes a transmitter (i.e., a driver) and a receiver (or buffer) connected by a transmission path. The transmission path includes a pair of transmission lines across which a pair of differential signals are sent. The receiver receives the pair of differential signals and includes a detect circuit, a level shift circuit, and a sense circuit. The detect circuit detects the voltages upon the pair of differential signals and, more particularly, the common mode voltage of those signals. If the common mode voltage exceeds a predefined amount, then the detect circuit will send a control signal to the level shift circuit. The level shift circuit, upon receiving the control signal, reduces each voltage of the differential input signal. Preferably, the level shift circuit reduces the voltage by forwarding a selectable current through a resistor that causes the IR drop to register a lessened or reduced voltage on the input of the sense circuit. The sense circuit will then receive the reduced voltage on each of the differential input signals.

The detect circuit is, therefore, used to detect if a common mode voltage of the differential signals exceeds a threshold value. The level shift circuit reduces each voltage of the differential input signal, or the common mode voltage of those differential signals, if the common mode voltage being detected exceeds the threshold amount. The level shift circuit simply contains a pair of resistors where one end of each of the pair of resistors is connected to the differential input line, and the other end of each of the pair of resistors is connected to a corresponding one of the pair of transistors. The pair of transistors control the amount of voltage reduction (if any) adaptively placed onto the sense circuit. The sense circuit is preferably a pair of differential transistors connected to a pair of load resistors.

According to yet another embodiment, a method is provided. The method includes the steps of reducing the voltages of the differential input signals if a common-mode voltage of the differential input signals exceed a predefined amount. The voltages of the differential input signals are not reduced if the common-mode voltage of the differential input signals does not exceed a predefined amount. The reduced or non-reduced differential input signals are then forwarded to the sense circuit that produces signal levels that conform to the minimal accepted levels of the receiving system.

BRIEF DESCRIPTION OF THE DRAWINGS

Other objects and advantages of the invention will become apparent upon reading the following detailed description and upon reference to the accompanying drawings in which.

DETAILED DESCRIPTION OF PREFERRED EMBODIMENTS

Figure 1:
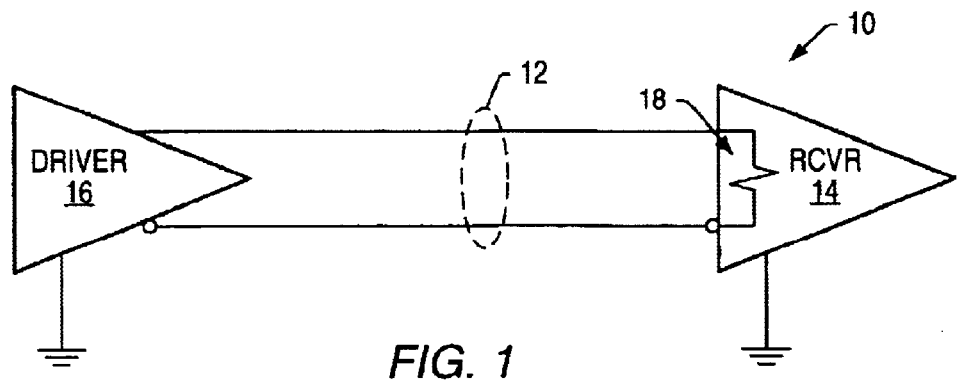
FIG. 1 is circuit schematic diagram of a differential signal transmission line coupled between a driver and receiver.

Turning now to the drawings, FIG. 1 illustrates a transmission system 10. System 10 includes a transmission path made up of possibly two lines that are configured to receive differential signals. The opposing ends of transmission path 12 include a pair of transceivers. Each interface device preferably has a receiver and a driver, with system 10 shown only with the buffer (or receiver) and driver portions 14 and 16, respectively. Driver 16 drives the differential signals across path 12 and receiver 14 senses the voltage differential of those signals and, preferably, rejects the common-mode voltage associated with both signals. If the differential signals are low voltage differential signals (LVDS) specified by the American National Standards Institute (ANSI)/

Telecommunications Industry Association (TIA)/Electronic Industries Alliance (EIA) 644 standard, or the IEEE Std. 1596.3 standard, then associated with the receiver is a termination resistor 18 that is nominally 100 ohms, but can vary possibly 20 ohms from that nominal amount.

Figure 2:
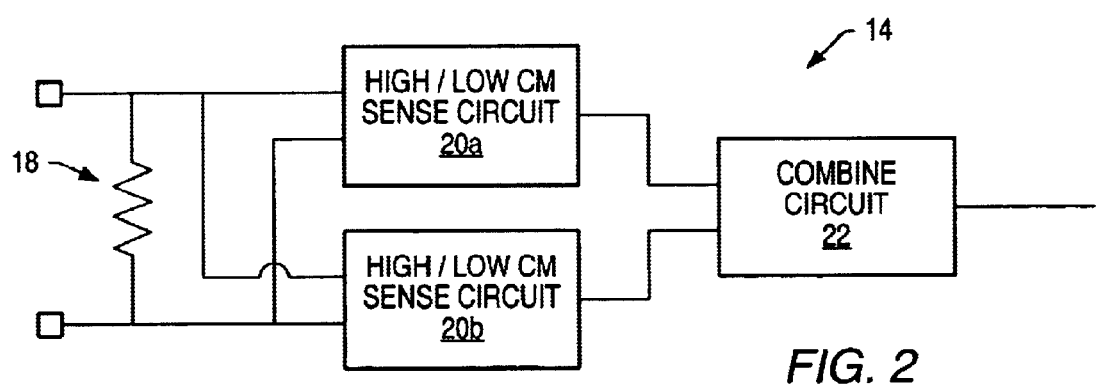
FIG. 2 is a circuit block diagram of a receiver having a staged pair of sense circuits coupled in parallel to each of the differential signal lines to sense input signals across a wide common mode range.

Communication system 10 involves any communication system that operates in a low voltage environment and conveys data using differential signaling. FIG. 2 illustrates receiver 14 that is configured to receive a wide common mode voltage range attributed to the differential signals. In addition to termination resistor 18, receiver 14 includes possibly a two-stage pair of sense circuits 20a connected in parallel to another two-stage pair of sense circuits 20b, both of which are fed into a combine circuit 22. Each stage of sense circuit 20a or 20b includes a pair of differential transistors possibly connected to a corresponding pair of load resistors. Since both a high common-mode sense circuit and a low common-mode sense circuit are connected possibly in series, the overall sense circuit 20a, 20b and the combine circuit 22 can be relatively large and complex. While sense circuit 20a and 20b can sense differential signals across a relatively wide range of, for example, 0–2.4 volts, the complex sense circuitry must also include the combine circuitry that takes the form of a folded cascode stage.

Certain applications do not require a wide common-mode range. For example, an OC-192 SERDES framer that follows the SFI-4 protocol may only require a differential inputs between 800 millivolts to 2.4 volts for any receiver which receives LVDS inputs. A standard LVDS receiver, however, is unable to sense a common mode voltage near the top of the LVDS specification of 2.4 volts if a reduced power supply of, for example, 1.8 volts is used. A maximum differential input of 2.4 volts would exceed the supply by more 600 millivolts. Instead of increasing the power supply from 1.8 volts, for example, to 2.5 volts to accommodate the higher common-mode voltage, or possibly level shifting the common-mode voltage of 2.4 volts down by 600 millivolts so as to use the multi-staged, parallel-configured receive architecture of FIG. 2, a more preferable solution is to adaptively level shift only signals at the high end of the common-mode voltage range, but not signals at the low end of the common-mode voltage range.

Figure 3:
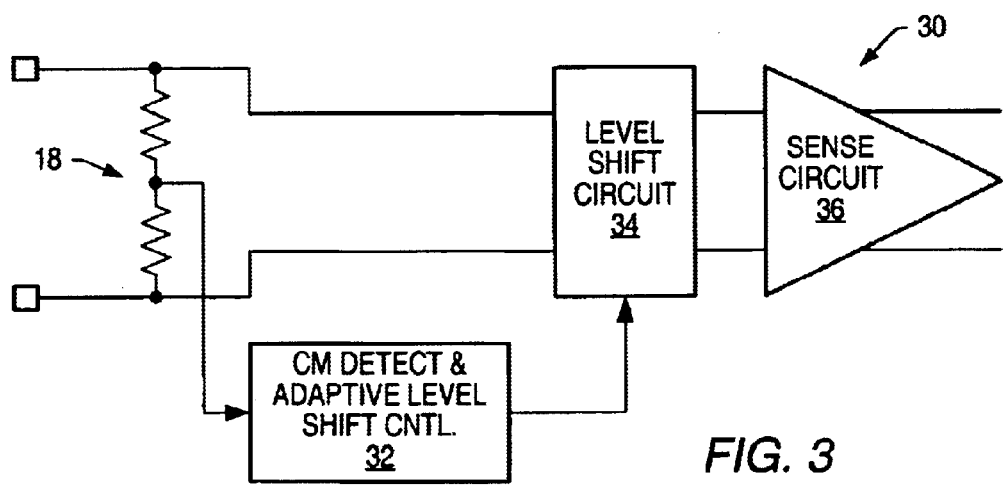
FIG. 3 is a circuit block diagram of a receiver that includes a detector for determining a common mode voltage of the differential input signals and for selectively sending a control signal depending on the common mode voltage of the differential input signals, a level shifter that changes the differential input signals depending on the presence of absence of the control signal, and a simple sense circuit that receives either the changed or non-changed differential input signals.

FIG. 3 illustrates an improved receiver 30. Receiver 30 includes the termination resistor 18 needed for LVDS inputs, but also includes a detect circuit 32 and a level shift circuit 34, as well as a relatively simplistic sense circuit 36. Termination resistor 18 can be placed either upon the integrated circuit that bears receiver 30 or, possibly, on an integrated circuit separate and independent from the integrated circuit of receiver 30. The differential signals sent from the driver of the communication system is placed across the termination resistor to produce a current. The driver can, therefore, produce current between approximately 2.5 milliamps to 3 milliamps, and a switch box steers the current through the termination resistor 18. The differential driver thereby produces odd-mode transmission: equal and opposite current flows in the transmission lines. The current returns within the transmission line pairs so that the current loop area is small and, therefore, generates the lowest amount of electrical magnetic interference. Data rates as high as several Gbps are possible without a substantial increase in power dissipation. In addition, the constant current driver output can tolerate transmission lines shorted together or to ground without creating significant thermal issues.

The differential buffer or receiver 30 is thereby a high-impedance device that detects differential signals as low as possibly 100 millivolts (or slightly lower) and then amplifies them into standard logic levels. A typical LVDS receiver accepts an input range of between 0–2.4 volts and allows rejection of common-mode noise picked up along the interconnect of up to +/−1 volt. If, however, the input range can be lessened to 800 millivolts to 2.4 volts, then the upper common-mode range can be level shifted so that the receiver circuit can be powered from a lower power supply voltage.

The common mode voltage of the differential input signals can be taken at a midpoint of the termination resistor 18 by detect circuitry 32. If the common mode voltage needs to be level shifted before it is sent to the receiver sense circuitry 36, detect circuitry 32 sends a command signal to level shift circuit 34. Level shift circuit 34 can then reduce the input voltages (or common-mode voltage) of voltages near the top of the input range. If the common-mode voltage of the differential input signal is closer to the bottom of the range (e.g., near 800 millivolts), the signal is not level shifted. If the common-mode voltage of the input signals is somewhere in the middle of the range between, for example, 800 millivolts to 2.4 volts, the input signal is level shifted by 0 (at the low end of the range) upwards to possibly 400 millivolts (near the upper end of the range). The amount of level shift depends on where along the common mode range the differential input signals reside. The net effect is reduction in the common-mode range of the input signal from 0.8–2.4 volts to 0.8–2.0 volts, for example. Within this reduced range, not only can a relatively simple sense circuit be used, but also a reduced receiver supply voltage can be used.

Figure 4:
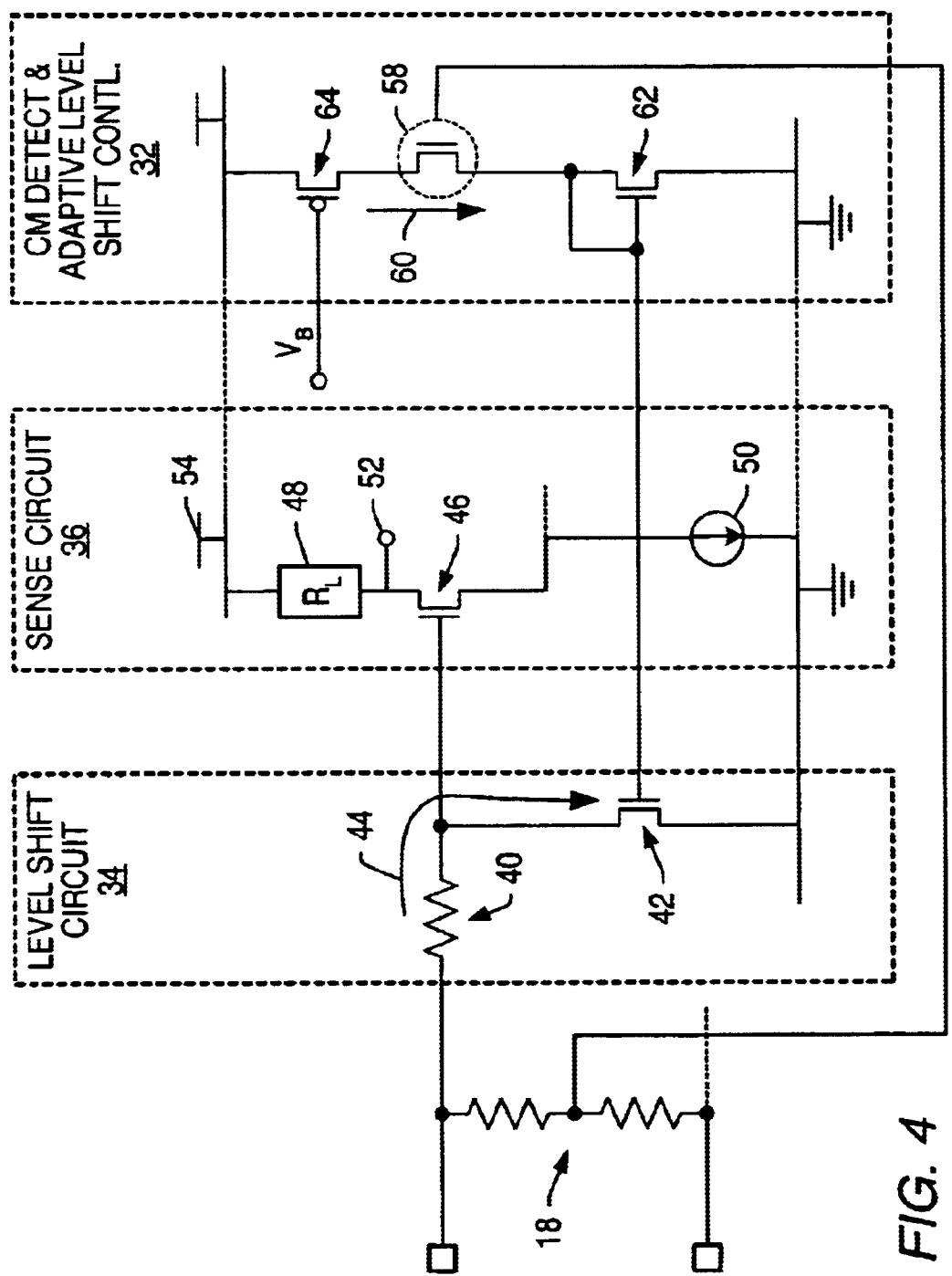
FIG. 4 is a circuit schematic diagram of the receiver of FIG. 3 (shown as replicated single-ended receiver—differential receiver), indicating the detect circuit, the level shift circuit and the sense circuit in more detail.

Referring to FIG. 4, receiver 30 is shown in further detail. More specifically, each differential input line is connected to the single-ended receiver circuit shown in FIG. 4. Accordingly, FIG. 4 illustrates a single end of what is understood to be a fully differential receiver. Thus, it is appreciated that the detect circuit 32, level shift circuit 34, and sense circuit 36 are for each input to form a fully differential receiver circuit 30. Both sides of the differential signal lines are sent to level shift circuit 34. The differential input signals can then be selectively level shifted by an IR drop across a resistor 40. According to one example, the resistor can be a 2K ohm resistor, whereby a 200 $\mu$a (i.e., 400 millivolts/2K ohms) current may be sunk by transistor 42 via path 44.

The reduced voltage (i.e., the differential voltage on each input terminal and/or the common-mode input voltage) resulting from the IR drop is then presented to sense circuit 36. Sense circuit 36 includes a transistor 46 and a load resistor 48. The rather simple sense circuit 36 coupled to each of the input terminals of receiver 30 consist of only a transistor and a load resistor to form a receiver sense circuit that is made up of a differential transistor pair with a pair of corresponding resistor loads. Sense circuit 36 can operate with an input voltage range of between 800 millivolts–2.0 volts. If a 100 millivolt differential swing is present on the differential input signals, then the common-mode voltage range would be approximately 850 millivolts to approximately 1.95 volts.

The reduced voltage caused by the IR drop will be presented to the base or gate of transistor 46, and reflected upon the source or emitter terminal of transistor 46. Since the source or emitter terminal is connected to a current source 50, a relatively constant current will be drawn across the conductive path of transistor 46 as well as the resistor load 48. Given the relatively constant current across the conductive path, any change in the differential voltage upon the gate or base of transistor 46 will be reflected onto the drain or collector of transistor 46 which, as shown in FIG. 4, is the output terminal 52. Any signal below, for example, 800 millivolts on the input to transistor 46 may not be registerable on the output node 52. Conversely, any signal above 2 volts might have a highly attenuated output especially whenever the power supply voltage at node 54 is relatively low (i.e., is less than 2.4 volts, and preferably less than 2.0 volts). Optimally, for an input level range of 0.8–2.4 volts, the amount of IR drop should be approximately 400 millivolts or within the range of 350–450 millivolts or, possibly, 375–425 millivolts. The IR drop will cause the maximum voltage of the differential input voltages to be approximately 2.0 volts as registered upon the input of transistor 46. If the power supply voltage is 1.8 volts, then a 2.0 volt input that might fluctuate downward by approximately 100 millivolts, could be easily registered as differential signals upon output node 52. However, if the IR drop were to exceed 400 millivolts then, while possibly greater differential can be obtained on the output node 52, a deleterious increase in resistance must be achieved by resistor 40. This would cause an increase in the RC impedance seen at the input to receiver 30. For high speed data transmission, an increase in input impedance should be avoided.

In order to only selectively apply the IR drop when the input voltage range reaches a maximum voltage value or when the common-mode voltage is relatively high, a level shift control circuit 32 is used. Circuit 32 detects the common-mode voltage on the input of a choke transistor 58 (shown encircled with dotted lines). If the common mode voltage is high enough to turn on transistor 58, then current will travel along path 60. The amount of current along path 60 should ideally be the same as the current along path 44. Transistor 62 is a diode-connected transistor and the turn-on characteristics of transistor 62 are mirrored to transistor 42. Accordingly, transistors 42 and 62 operate as a current mirror. The bias voltage ($V_B$) upon transistor 64 establishes a current along path 60, which is mirrored onto path 44. Therefore, $V_B$ is chosen to set the current in path 44.

Circuit 32 thereby controls the bias of transistor 42 and if transistor 42 is turned off, there will be no IR drop across resistor 40. Transistor 58 within circuit 32 essentially "chokes" the current along paths 60 and 44. When the common-mode (midpoint) voltage received by transistor 58 is relatively low, transistor 58 will choke the bias current and force transistor 62 to turn off. This will also cause transistor 42 to turn off, thereby preventing any IR drop across resistor 40.

Figure 5:
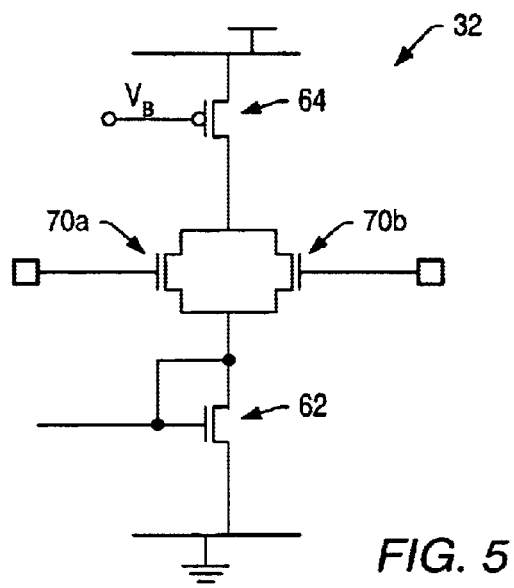
FIG. 5 is a circuit schematic diagram of the detect circuit according to another embodiment.

Referring to FIG. 5, an alternative arrangement of detect circuit 32 is shown. Instead of drawing the common-mode voltage from a midpoint of the termination resistor, the differential voltages themselves can be forwarded to a pair of parallel-coupled transistors 70a and 70b. Everything else within detect circuit 32 remains identical to the detect circuit shown in FIG. 4. Namely, bias transistor 64 is coupled between the choke transistors 70 and the power supply, and the current mirror transistor 62 is connected between the choke transistors 70 and ground. For example, if the differential voltages on the differential input signals are at 800 millivolts and 900 millivolts, then neither voltage will activate choke transistors 70 and current mirror transistor 62. However, if the differential voltages exceed, for example, 1.0 volts or 1.5 volts, then both choke transistors 70 and current mirror transistor 62 are turned on. In the midpoint between a low common-mode voltage and a high common-mode voltage possibly only one transistor of the choke transistors 70 will turn on momentarily, while the other transistor will thereafter turn on momentarily—the effect of which is to turn on the choke transistors in the linear range of those transistors and reflect a corresponding IR drop that may be somewhere between 0 volts with no IR drop (when a low common-mode voltage is encountered) and 400 millivolts with maximum IR drop (when a high common-mode voltage is encountered).

FIG. 5 indicates a detect circuit 32 that can be used with a termination resistor that might be on an integrated circuit altogether separate and independent from the integrated circuit bearing receiver 30. Simply connecting the choke transistor gate or base terminal to the differential input terminal of the receiver does not require connection to a midpoint of a resistor found on-chip.

Figure 6:
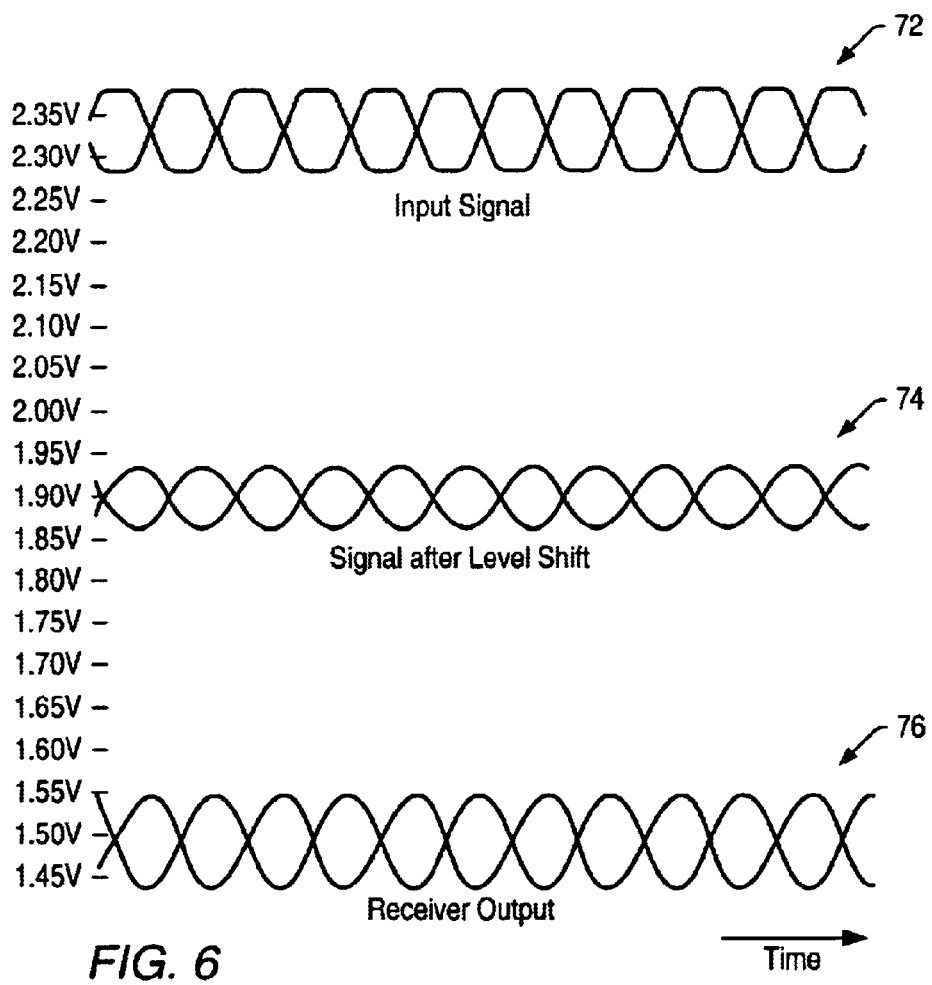
FIG. 6 is timing diagram of the differential input signals having a relatively high common mode voltage being selectively shifted downward by the level shift circuit of FIGS. 3 and 4.

FIG. 6 illustrates the methodology by which differential input signal 72 can be shifted downward by the level shift circuit, as shown by signal 74. The input signal is shifted downward only if the voltage magnitude of the differential input signal exceeds a predefined amount. Moreover, the amount of shift depends to some degree on the amount by which the differential input signal voltage exceeds that predefined amount. The more the differential input signal voltage exceeds the threshold, the more the signal will be level shifted. The input signals before and after level shift can be at voltages dissimilar from those shown in FIG. 6. The result, however, is that at high common-mode voltages, a level shift occurs whereas at low common-mode voltages, a level shift does not occur. Yet, even though the reduced (or shifted) input voltage might exceed the power supply voltage, the receiver output is able to differentiate the differentially received input signals, as shown by reference numeral 76.

It will be appreciated to those skilled in the art having the benefit of this disclosure that the various embodiments herein are ones involving a communication system and, more specifically, a receiver that can selectively shift differential input voltages received by the receiver. The receiver can be an LVDS receiver that is designed to meet the SFI-4 LVDS input specification. The SFI-4 LVDS input specification defines an input voltage range of between 800 millivolts to approximately 2.4 volts. The sense circuit of the LVDS receiver simply involves a pair of differential transistors and a corresponding pair of load resistors, and can operate at a power supply voltage less than the reduced voltage being sent to the sense circuit. According to the SFI-4 LVDS input specification, the sense circuit is beneficially a low voltage sense circuit, and operates at a power supply less than the input voltage maximum amount or the common-mode voltage maximum amount. The voltage amounts set forth above are merely examples and are not intended to limit the following claims which must be interpreted to embrace all such modifications and changes. Accordingly, the specification and drawings are to be regarded in an illustrative rather than a restrictive sense.

What is claimed is:

1. A receiver, comprising:
   a detect circuit coupled to produce a control signal depending solely on a common mode voltage of a pair of differential input signals;
   a level shift circuit coupled to receive the pair of differential input signals, and reduce the common mode voltage upon receiving the control signal; and
   a sense circuit coupled to receive the reduced said common mode voltage.

2. The receiver as recited in claim 1, wherein the common mode voltage is a median between a pair of voltages corresponding to the differential input signals.

3. The receiver as recited in claim 2, wherein the sense circuit is coupled to receive a power supply voltage that is a pre-determined amount below a maximum voltage of the pair of voltages.

4. The receiver as recited in claim 2, wherein the sense circuit is coupled to receive a power supply voltage that is a pre-determined amount below a maximum voltage of the pair of voltages after having reduced the common mode voltage of the pair of voltages by the level shift circuit.

5. The receiver as recited in claim 1, wherein the detect circuit produces the control signal whenever the common mode voltage exceeds a pre-defined amount.

6. The receiver as recited in claim 1, wherein the sense circuit consists essentially of a pair of transistors coupled to a corresponding pair of resistor loads.

7. The receiver as recited in claim 6, wherein an output node is configured between each respective transistor and resistor load for producing a differential output from the receiver.

8. The receiver as recited in claim 1, wherein the level shift circuit comprises:
   a pair of resistors coupled between the sense circuit and a corresponding pair of terminals to receive the pair of differential input signals; and
   a pair of transistors coupled between the sense circuit and the corresponding pair of resistors to, upon receipt of the control signal, form a current path through the pair of resistors and thereby allow a voltage drop between the pair of terminals and the sense circuit.

9. The receiver as recited in claim 8, wherein the sense circuit comprises a pair of transistors having a gate or base terminal coupled to the corresponding pair of transistors and pair of transistors.

10. A transmission system, comprising:
    a driver coupled to produce a pair of differential signals;
    a transmission path;
    a receiver coupled to receive the pair of differential signals via the transmission path, and wherein the receiver comprises:
      a detect circuit coupled to produce a control signal whenever a common mode voltage of the pair of differential signals exceeds a pre-defined amount;
      a level shift circuit that, upon receiving the control signal, reduces each voltage of the pair of differential signals, so that the maximum voltage of said each voltage exceeds a supply voltage, but does not exceed the supply voltage by more than the pre-determined amount; and
      a sense circuit coupled to receive the reduced each said voltage of the pair of differential signals.

11. The transmission system as recited in claim 10, wherein the pre-defined amount is in the range of approximately 1.0 volts to 1.5 volts.

12. The transmission system as recited in claim 10, wherein the pre-determined amount is in the range of approximately 150 millivolts to 250 millivolts.

13. The transmission system as recited in claim 10, wherein the pre-determined amount is in the range of approximately 175 millivolts to 225 millivolts.

14. The transmission system as recited in claim 10, wherein the amount by which the level shift circuit reduces each voltage of the differential input signal is in the range of approximately 350 millivolts to 450 millivolts.

15. The transmission system as recited in claim 10, wherein the amount by which the level shift circuit reduces each voltage of the differential input signal is in the range of approximately 375 millivolts to 425 millivolts.

16. The transmission system as recited in claim 10, wherein the supply voltage is approximately 1.8 volts, and the maximum voltage of each said voltage is approximately 2.0 volts.

17. The transmission system as recited in claim 10, wherein the sense circuit consists essentially of a pair of transistors coupled to a corresponding pair of resistor loads.

18. The transmission system as recited in claim 17, wherein the sense circuit comprises an output node configured between each respective transistor and resistor load for producing a differential output from the receiver.

19. A method of adjusting differential input signals, comprising:
    when a common mode voltage of the differential input signals exceeds a pre-defined amount, reducing the voltages of the differential input signals;
    when a common mode voltage of the differential input signals does not exceed a pre-defined amount, not reducing the voltages of the differential input signals; and
    forwarding the reduced or non-reduced differential input signals to a sense circuit.

20. The method as recited in claim 19, wherein said reducing comprises shifting each of the voltages of the differential input signals in the range of approximately 350 millivolts to 450 millivolts.

21. The method as recited in claim 19, wherein said reducing comprises forwarding current through a resistor that has one end coupled to a transistor current path which is selectable depending on the amount by which the common mode voltage exceeds the pre-defined amount.

* * * * *

UNITED STATES PATENT AND TRADEMARK OFFICE
CERTIFICATE OF CORRECTION

PATENT NO. : 6,768,352 B1
DATED : July 27, 2004
INVENTOR(S) : Maher et al.

It is certified that error appears in the above-identified patent and that said Letters Patent is hereby corrected as shown below:

<u>Column 9,</u>
Line 32, after the pharse "coupled to the corresponding," please delete "pair of transistors" and substitute therefor -- pair of resistors --.

Signed and Sealed this

Seventh Day of December, 2004

JON W. DUDAS
*Director of the United States Patent and Trademark Office*